United States Patent
Silvertown

[11] 3,784,894
[45] Jan. 8, 1974

[54] ALTERNATORS
[75] Inventor: Cyril Silvertown, London, England
[73] Assignee: Rotax Limited, Birmingham, England
[22] Filed: June 5, 1972
[21] Appl. No.: 259,795

[30] Foreign Application Priority Data
June 11, 1971 Great Britain.................... 27411/71

[52] U.S. Cl......................... 321/47, 322/90, 322/93
[51] Int. Cl. ............................................ H02m 7/44
[58] Field of Search......................... 321/47, 51, 58; 322/28, 90, 93

[56] References Cited
UNITED STATES PATENTS
3,364,412 1/1968 Sauter............................... 322/28 X
3,400,318 9/1968 Hill................................... 322/93 X
3,424,970 1/1969 Ross................................. 321/47 X Primary Examiner—William M. Shoop, Jr.
Attorney—John C. Holman et al.

[57] ABSTRACT

An electrical power supply system comprising an alternator having a closed output winding divided into at least five phase windings and including an equal number of pairs of diode rectifiers for producing a d.c. output. Tappings are provided on the winding for additionally providing a balanced multi-phase alternating current output.

3 Claims, 1 Drawing Figure

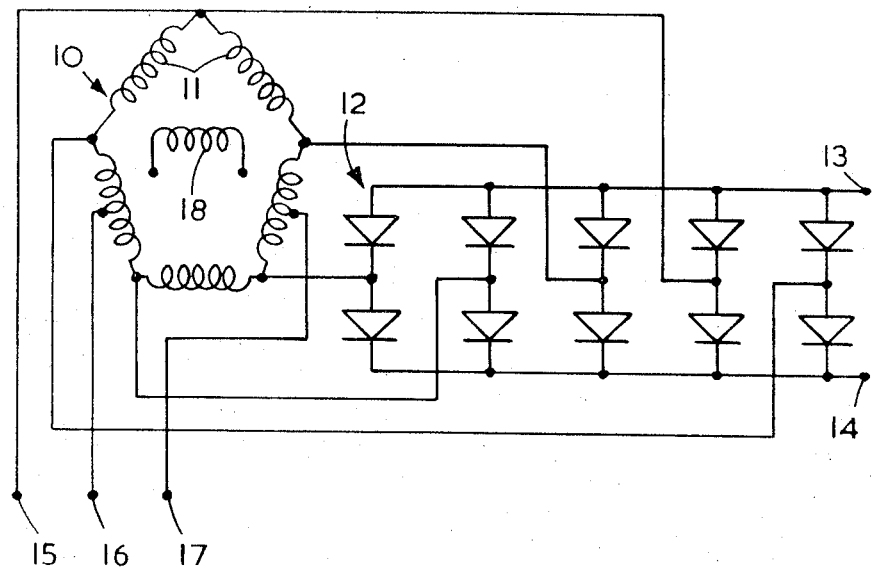

ALTERNATORS

This invention relates to alternators and has for its object to provide an alternator in a simple and convenient form and in which two multi phase alternating current supplies having differing numbers of phases can be obtained.

An alternator in accordance with the invention comprises in combination a closed winding composed of a number of phase windings equal to that of the required supply having the higher number of phases, and tappings on the winding positioned to produce the second supply.

According to a further feature the invention resides in a power supply system comprising an alternator having a closed output winding divided into at least five phase windings, an equal number of pairs of rectifiers for producing a d.c. otuput and tappings on said winding for producing a balanced multi phase alternating current output.

In one example of the invention shown in the accompanying circuit diagram it is required to provide a rectified a.c. supply and in addition a three phase a.c. supply. The amplitude of the ripple content of the rectified a.c. supply is important in the particular application and should be lower than one would obtain with a three phase rectified a.c. supply in order to minimise the degree of smoothing required and hence the space and weight of the components in the smoothing circuit. Moreover, the diodes required in the rectifier system will have a smaller physical size as the number of phases of the supply increases.

In the present arrangement the ripple content is such as to demand a five phase alternating current supply which is rectified by five pairs of rectifiers connected in bridge fashion. The unidirectional output has the low ripple amplitude desired and in addition although two more pairs of rectifiers are used than would be the case if a three phase supply were rectified, each rectifier of the five pairs os smaller than the case where a three phase supply is rectified.

The five phase supply is obtained from an alternator having a closed winding 10 composed of five phase windings 11 the phase interconnections of which are connected to the pairs of rectifiers 12 respectively. The rectifiers feed output terminals 13, 14. The three phase supply is obtained at terminals 15, 16, 17 by tapping the phase windings 11 to produce a balanced three phase output. Conveniently although this is not essential, one of the phase interconnections of the winding is chosen as one of the lines of the three phase supply, and the two other lines of the three phase supply are obtained by tapping the second and fourth phase windings of the winding. Moreover, the exciting winding 18 is shown for the alternator.

I claim:

1. An alternator for producing two multi phase alternating current supplies having differing numbers of phases and comprising a closed winding composed of a number of phase windings equal to that of the required supply having the higher number of phases, and tappings on the winding positioned to produce the second multi-phase supply.

2. A power supply system comprising an alternator having a closed output winding divided into at least five phase windings, an equal number of pairs of rectifiers for producing a d.c. output and tappings on said winding for producing a balanced multi phase alternating current output.

3. A power supply system as claimed in claim 2 in which one of the phase interconnections of the winding is chosen as one of the lines of the multi phase alternating current output.

* * * * *